United States Patent
Ribarov et al.

(12)

(10) Patent No.: US 9,945,376 B2
(45) Date of Patent: Apr. 17, 2018

(54) GEAR PUMP

(71) Applicant: Hamilton Sundstrand Corporation, Charlotte, NC (US)

(72) Inventors: Lubomir A. Ribarov, West Hartford, CT (US); Leo J. Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 34 days.

(21) Appl. No.: 15/072,151

(22) Filed: Mar. 16, 2016

(65) Prior Publication Data

US 2017/0268507 A1    Sep. 21, 2017

(51) Int. Cl.
| F04C 2/18 | (2006.01) |
| F04C 11/00 | (2006.01) |
| B64D 37/34 | (2006.01) |
| F04C 2/08 | (2006.01) |

(52) U.S. Cl.
CPC ............ *F04C 2/18* (2013.01); *B64D 37/34* (2013.01); *F04C 2/088* (2013.01); *F04C 11/003* (2013.01); *F04C 11/001* (2013.01); *F04C 2240/40* (2013.01)

(58) Field of Classification Search
CPC ...... F04C 2/18; F04C 11/003; F04C 2240/40; B64D 34/34
See application file for complete search history.

(56) References Cited

U.S. PATENT DOCUMENTS

| 1,870,192 A | 8/1932 | Butler |
| 3,953,160 A | 4/1976 | Bottoms |
| 3,981,646 A | 9/1976 | Bottoms |
| 4,682,938 A | 7/1987 | Riordan |
| 6,123,533 A | 9/2000 | McBurnett et al. |
| 6,932,587 B2 * | 8/2005 | Dong .................. F03C 2/08 418/186 |
| 7,878,781 B2 * | 2/2011 | Elder .................. F04C 2/086 418/189 |
| 8,118,579 B2 * | 2/2012 | Klassen ............... F04C 2/084 418/166 |
| 8,137,085 B2 | 3/2012 | Ni et al. |
| 2004/0228752 A1 | 11/2004 | Peters et al. |

(Continued)

FOREIGN PATENT DOCUMENTS

| DE | 4012929 A1 | 10/1990 |
| DE | 20310626 U1 | 11/2004 |

(Continued)

OTHER PUBLICATIONS

Extended European Search Report for EP Application No. 17156821.5, dated Aug. 22, 2017, 14 pages.

*Primary Examiner* — Mark Laurenzi
*Assistant Examiner* — Dapinder Singh
(74) *Attorney, Agent, or Firm* — Kinney & Lange, P.A.

(57) ABSTRACT

An embodiment of a gear pump arrangement includes a first gear defining a first set of teeth; and a second gear defining a second set of teeth, the first set of teeth and the second set of teeth being in meshed communication such that fluid is pumped in response to rotation of the first gear and the second gear, at least one of the first set of teeth and the second set of teeth having at least one gear tooth passageway through each tooth thereby fluidically connecting opposing faces of the tooth.

17 Claims, 8 Drawing Sheets

(56) References Cited

U.S. PATENT DOCUMENTS

2007/0178003 A1 8/2007 Zhu et al.
2010/0266437 A1 10/2010 Martin-Dye
2012/0141316 A1 6/2012 Wakefield et al.
2012/0219449 A1 8/2012 Ni et al.
2013/0319153 A1 12/2013 Ni

FOREIGN PATENT DOCUMENTS

| DE | 102008007464 A1 | 9/2008 |
| EP | 1722103 A2 | 11/2006 |
| EP | 2977591 A1 | 1/2016 |
| FR | 2854220 A1 | 10/2004 |

* cited by examiner

GEAR PUMP

BACKGROUND

The disclosure relates generally to gear pumps, and more specifically, to gear pumps with reduced cavitation.

Though gear pumps are considered highly reliable, in some aircraft engine applications, incorrectly or inconsistently pressurized fuel or oil can seriously affect engine system performance and reduce component life. For example, vapor pockets or bubbles are seen under certain flow or operating conditions of conventional gear pumps. Under certain operating conditions, two-phase flow occurs. If left alone, vapor pockets can collapse from flashback into liquid phase, thus resulting in unwanted flow cavitation of liquid converging into spaces between rapidly unmeshing gear teeth. This is noisy, creating pressure waves, which more quickly erode the gear teeth, increasing repair costs and frequency.

In the short term, erosion products from cavitation bubbles' flashback can also contaminate the fluid being pumped, requiring additional filtration to prevent component damage and/or pollution. In the longer term, filters need to be changed more frequently, and the pumping efficiency of the gear pump is reduced due to uneven flow surfaces, necessitating replacement or repair.

SUMMARY

An embodiment of a gear pump arrangement includes a first gear defining a first set of teeth; and a second gear defining a second set of teeth, the first set of teeth and the second set of teeth being in meshed communication such that fluid is pumped in response to rotation of the first gear and the second gear, at least one of the first set of teeth and the second set of teeth having at least one gear tooth passageway through each tooth thereby fluidically connecting opposing faces of the tooth.

An embodiment of a gear pump assembly includes a motive input and a first pump stage. The first pump stage includes a first drive gear operably connected to the motive input, and a first driven gear in meshed communication with the first drive gear. A first plurality of gear tooth passageways is disposed through at least one of the first plurality of drive gear teeth, and the first plurality of driven gear teeth. Each of the first plurality of passageways fluidically connects a gear tooth passageway entrance on a first high-pressure fluid gear tooth face, and a gear tooth passageway exit on a first low-pressure fluid gear tooth face.

An embodiment of a line-replaceable unit includes a first gear arrangement, which includes a first plurality of gear teeth disposed generally circumferentially about a first gear body. A first plurality of gear tooth passageways is disposed through the first plurality of gear teeth. Each of the first plurality of passageways extend between an entrance on a first gear tooth face, and an exit on a second fluid gear tooth face. A total area of the gear tooth exit is greater than a total area of the gear tooth entrance.

DETAILED DESCRIPTION

Figure 1:
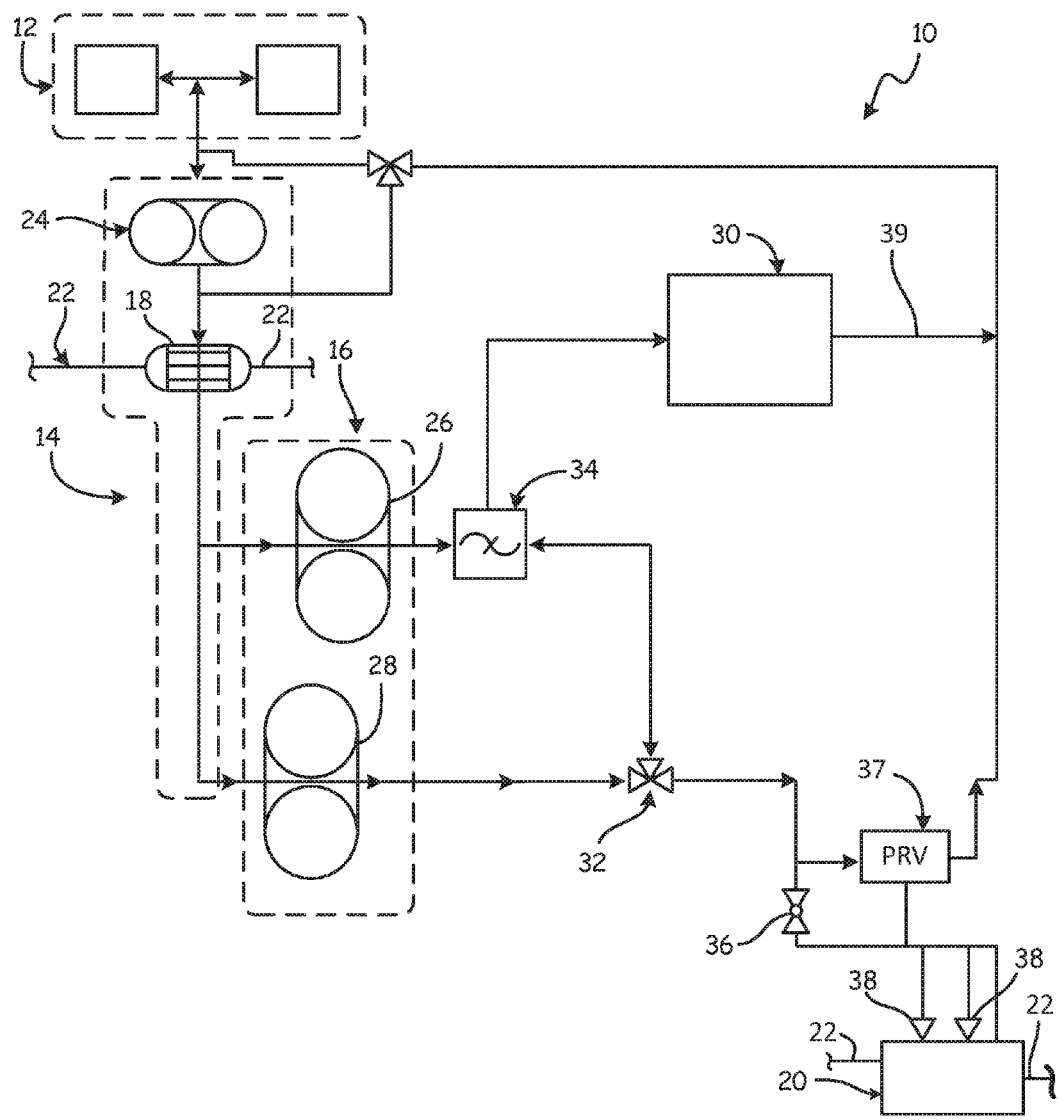
FIG. 1 schematically depicts a basic example embodiment of a fuel system for a gas turbine engine.

FIG. 1 is a schematic representation of fluid handling system 10, which includes one or more fluid storage reservoirs 12, fluid gathering system 14, and dual-stage fluid pump assembly 16. Generally, fluid gathering system 14 can include one or more pipes, boost pumps, or other appurtenances in fluid communication with fluid storage reservoir(s) 12, while fluid pump assembly 16 is in communication with, and can receive fluid from gathering system 14.

Fluid handling system 10 is described with respect to an illustrative, non-limiting embodiment of fuel system for one or more gas turbine engines installed on an aircraft. Though described with respect to certain illustrative embodiments, it will be appreciated that fluid handling system 10 can be readily adapted (e.g., by adding, modifying, substituting, or omitting certain application-specific components) to other numerous applications including but not limited to gas turbine and/or transportation applications. Even in the realm of aircraft engines, arrangement and selection of certain components in fluid handling (e.g., fuel) system 10 can vary according to particular aircraft- or engine-specific parameters outside the scope of the disclosure.

In this and other gas turbine applications, one or more heat exchangers 18 can also be incorporated into fuel system 10. In example embodiments for various aircraft, at least one of optional heat exchangers 18 can include a fuel-oil heat exchanger. Other means for thermal conditioning of fuel and/or other system fluids can additionally or alternatively be included as part of heat exchanger(s) 18.

To preheat or otherwise thermally condition fuel prior to entering dual-stage fuel pump assembly 16 and (eventually) engine 20, heat exchanger(s) 18 can be in selective thermal communication with engine oil 22 or other heated fluid flowing through an engine thermal management system (not shown). Though shown as being upstream of dual-stage fuel pump assembly 16, one or more heat exchangers 18 can additionally or alternatively be disposed downstream of dual-stage fuel pump assembly 16 without exceeding the scope of this disclosure.

To prepare fuel for use in the aircraft, including in engine 20, said fuel is pressurized via one or more fuel pumps. Low-pressure fuel boost pump 24 draws fuel out of tank(s) 12, such as but not limited to one or more wing-mounted, tail-mounted, and/or fuselage-mounted fuel tanks. As seen in FIG. 1, in one non-limiting example embodiment, dual-stage fuel pump assembly 16 also includes first gear pump stage 26 and second gear pump stage 28. In certain applications such as aircraft fuel systems, first and second gear pump stages 26, 28 can operate in parallel so as to provide pressurized fuel for various engine-related applications. Low-pressure fuel boost pump 24, can be driven for example, via excess shaft power used to drive pump stages 26, 28, increasing overall efficiency.

First gear pump stage 26 can include a pump selected from a servo fuel pump and a main fuel pump, while second gear pump stage 28 can include a pump selected from the other of the servo fuel pump and the main fuel pump. Under one possible mode of operation as part of a gas turbine engine's fuel system, during moderate to high power demand, a fraction of the incoming fuel from gathering system 14 can be diverted to first gear pump stage 26 while a second fraction (up to and possibly including the remainder) goes to second gear pump stage 28. Fuel pressurized by first gear pump stage 26 can be delivered primarily to serve as a hydraulic actuation fluid for actuators 30, operating various mechanical accessories in and around engine 20. Excess pressurized fuel from first gear pump stage 26 can be merged with pressurized fuel from second gear pump stage 28 via one or more pump sharing valves 32. Fuel from one or both stages can be cleaned (by fuel filter unit 34), and the combined pressurized fuel can then be metered (valve 36) and delivered via fuel nozzles 38 for combustion, providing primary motive power for engine(s) 20. Remaining preheated and/or pressurized fuel can then be used for auxiliary power via an APU (not shown), returned to fuel storage tank(s) 12 via pressure regulating bypass valve (PRV) 37 to line(s) 39, or otherwise recycled or reused for various system needs. Other valves, piping, and controls (not shown), making system 10 suitable for a particular application can also be incorporated in addition to, or in place of one or more of these elements.

Here, with reference to the illustrative example of an aircraft engine fuel system, first gear pump stage 26 operates as a servo gear pump while second gear pump stage 28 operates as a main gear pump. However, these roles can be reversed according to particular needs, operating parameters, or other considerations. Pump stages 26, 28 can be independent gear pumps, or can operate as part of a single assembly or unit (one non-limiting example shown in FIG. 9). Certain configurations of a fuel system, e.g., for more-electric aircraft (MEA) or all-electric aircraft (AEA), may differ from the examples explicitly shown and described herein without falling outside the scope of this disclosure. Hydraulic requirements in MEA or AEA are substantially reduced and thus, the corresponding demand on fuel pump stage(s) would be greatly reduced. In such examples, one of the stages could serve as the primary fuel pump with only the second stage provided solely for redundancy, or in certain cases, one stage can be eliminated altogether. At the same time, more than two pumps or pump stages can be included for systems with increased pumping demands.

Figure 2:
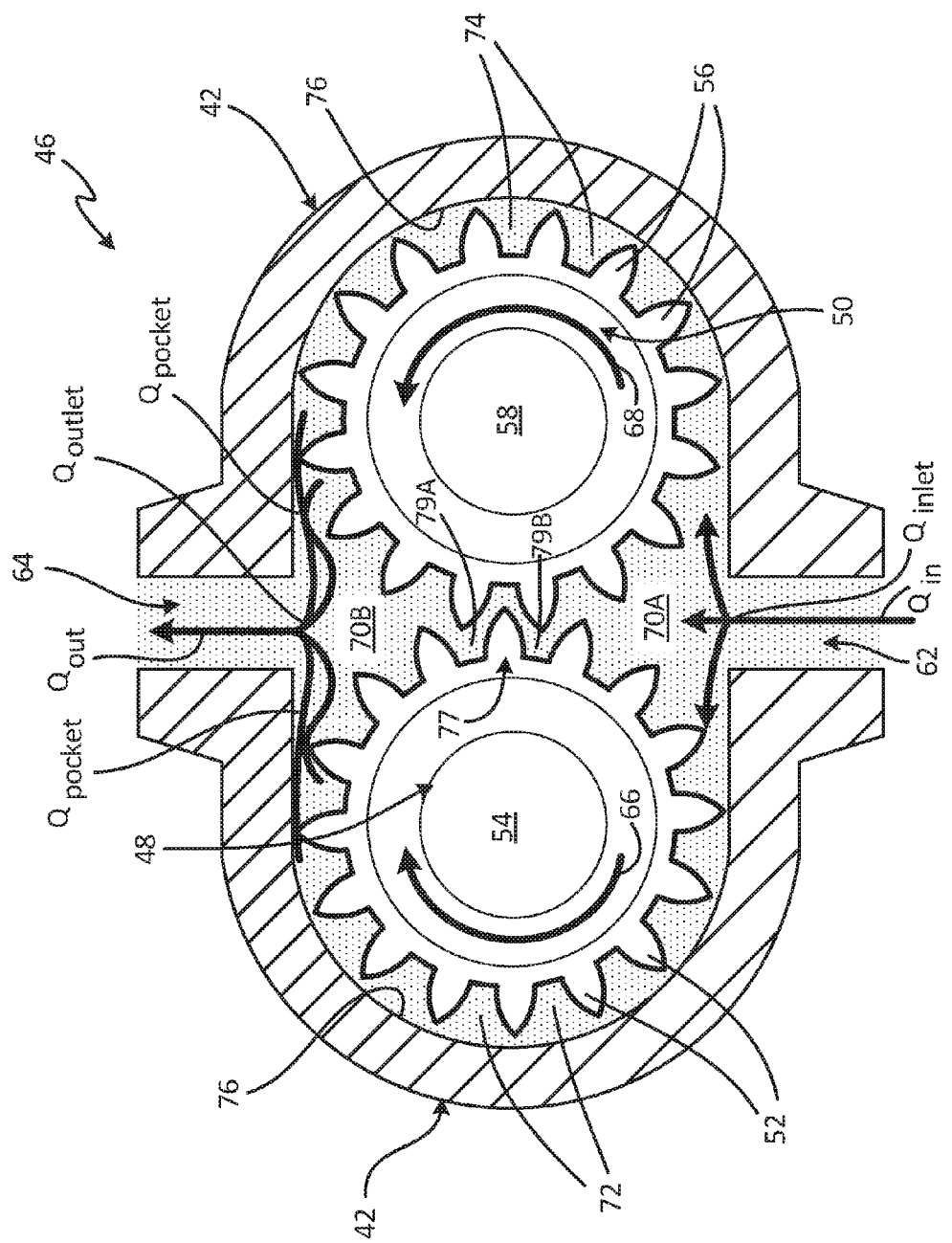
FIG. 2 is a general depiction of fluid flow through a gear pump conduit.

FIG. 2 schematically shows a basic flow path through a fluid conduit for a gear pump stage or assembly. Here, an example gear unit 46 is described with reference to first gear pump stage 26, but the description can also apply to other gear pump stages or assemblies, e.g., second gear pump stage 28 (shown in FIGS. 1 and 9).

The non-limiting example gear pump arrangement shown in FIG. 2 generally represents a first gear defining a first set of teeth and a second gear defining a second set of teeth. Here, gear unit 46 includes drive gear 48 meshed with driven gear 50, both shown as spur gears. Drive gear 48 can include a plurality of drive gear teeth 52 disposed generally circumferentially about at least drive gear body 54, and driven gear 50 can include a plurality of driven gear teeth 56 disposed generally circumferentially about driven gear body 58.

The non-limiting arrangement also shows that the first and second sets of teeth are in meshed communication such that fluid is pumped in response to rotation of the first and second gears. Here, drive gear teeth 52 can be meshed with driven gear teeth 56 to move fluid through the conduit from pump stage inlet opening 62 to pump stage outlet opening 64.

A fluid conduit generally is defined by the space(s) for fluid to flow through housing 42, and generally includes one or more parts of the housing cavity which are not occupied by gears 48, 50 or other ancillary elements of the pump. In the example shown, gears 48, 50 rotate in the directions represented by respective arrows 66, 68. Fluid to be pumped enters the conduit via pump stage inlet opening 62, which is connected to one or more supply pipes (not shown). As fluid enters, $Q_{in}$ expands into pump stage inlet opening 62 and becomes $Q_{inlet}$ within low-pressure conduit region 70A. Portions of this $Q_{inlet}$ flow, become $Q_{pocket}$ flow as incoming fluid is drawn around by and within drive gear pockets 72, and driven gear pockets 74 defined between circumferentially adjacent gear teeth. Most $Q_{pocket}$ flow proceeds around inner surfaces 76 of housing 42 toward high-pressure conduit region 70B, nearer to pump stage outlet opening 64. Fluid then converges from pockets 72, 74 and becomes $Q_{outlet}$ as the gears remesh an outlet side of region 77. This $Q_{outlet}$ flow then exits as $Q_{out}$ around toward pump stage outlet opening 64.

Figure 3A:
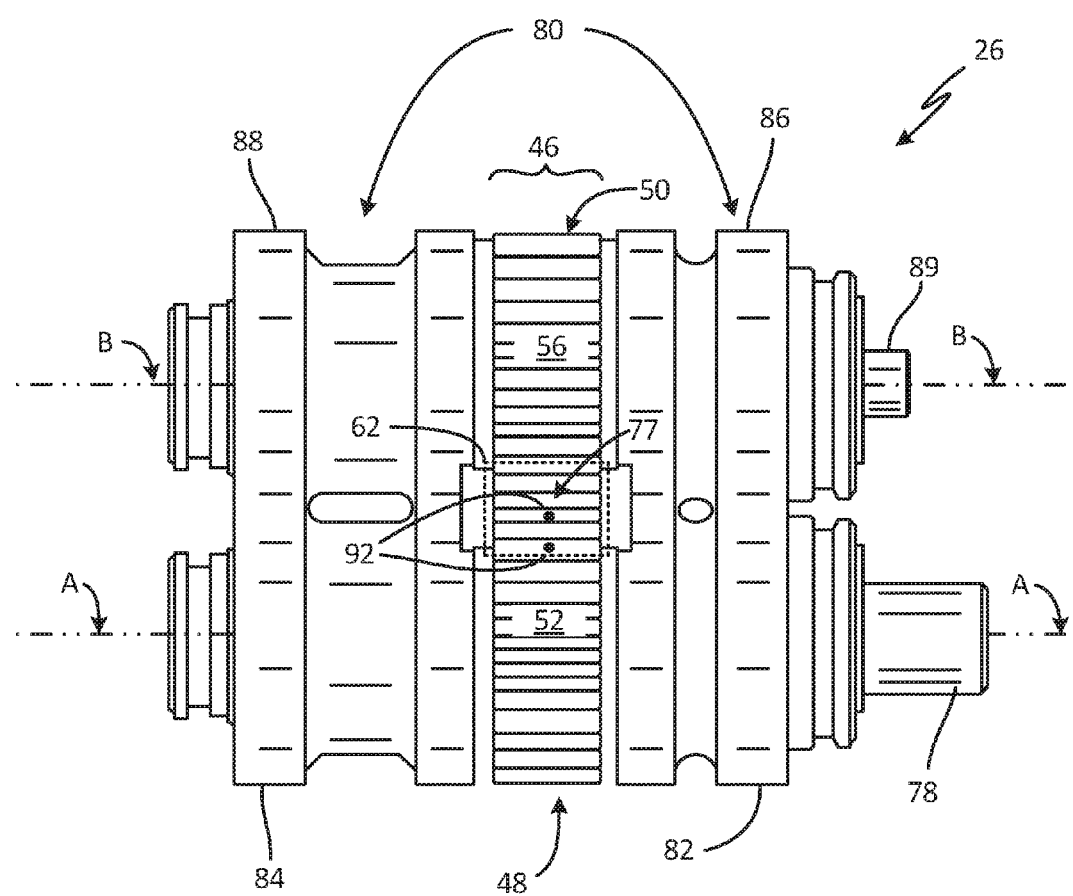
FIG. 3A shows an inlet side of an example gear pump stage.
Figure 9:
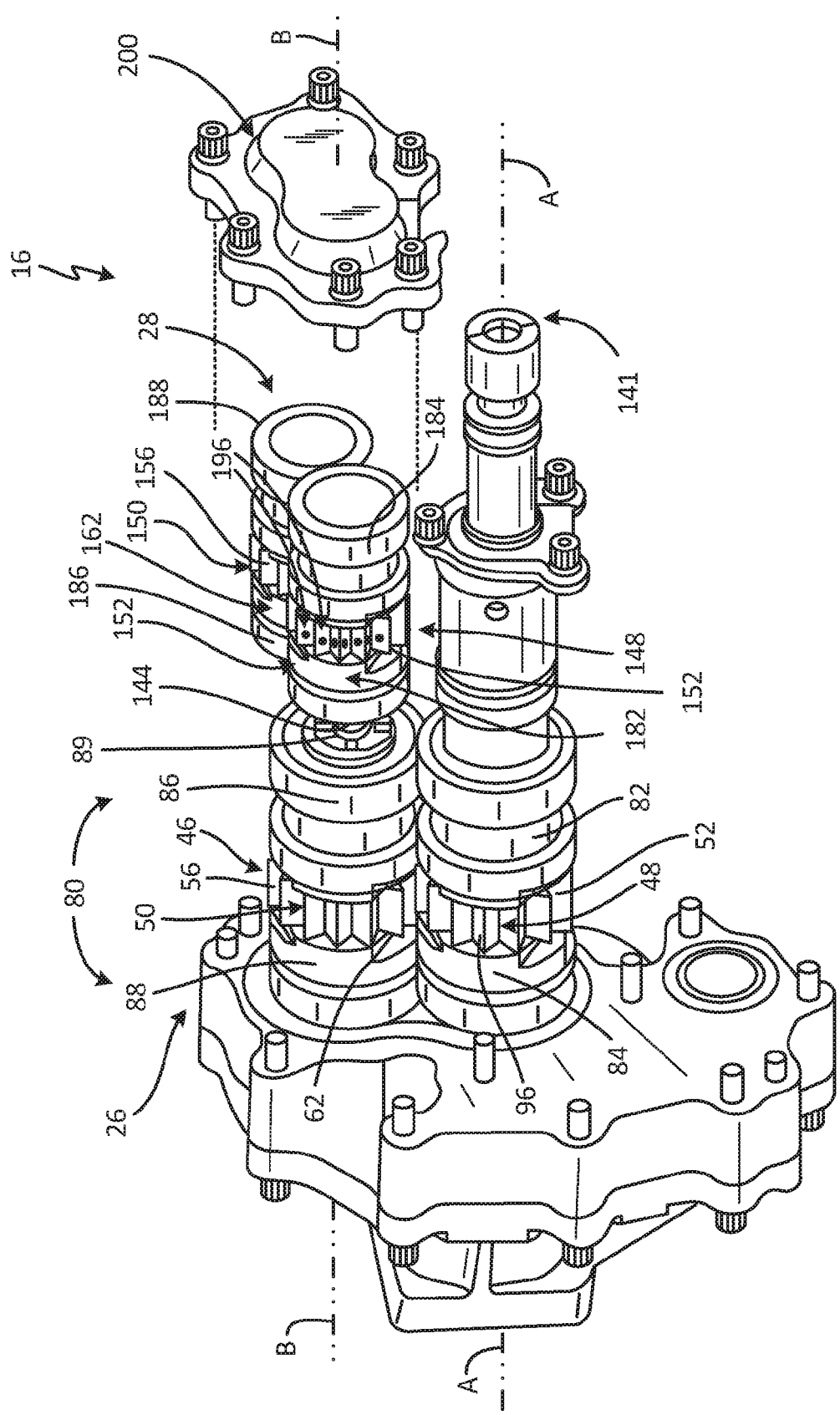
FIG. 9 is a perspective view of a fuel pump assembly including a main fuel gear pump and a servo fuel gear pump.

Motive power can be provided via rotatable coupling to drive gear 48 via any suitable configuration (example follows in FIG. 9). As shown in FIG. 3A, meshed teeth 52, 56 in region 77, between pump stage inlet 62 and pump stage outlet 64 (FIG. 2), allow rotation of driven gear 50, which in turn can be coupled to another apparatus such as another gear pump (e.g., a second gear pump stage or a low-pressure boost pump 24 shown in FIG. 1). To facilitate efficient meshing and fluid movement, in certain embodiments, one or both gears 48, 50 have an odd number of teeth. In certain of these embodiments, one gear has 17 teeth and another has 15 teeth.

Under certain conditions, most often at high rotational gear speeds, the vapor pressure of the fluid drops significantly as gears unmesh around the inlet side of meshing region 77. Conventionally, this results in vapor bubbles and two-phase flow generally in regions of the conduit already designed to house low-pressure fluid. More specifically vapor bubbles and two-phase flow have been found to be most frequent in and around unmeshing pockets 79B (FIG. 2). If left alone, these bubbles can collapse from the inrush of surrounding liquid, and the vapor around unmeshing pockets 79B can flash back into a liquid phase, creating pressure waves which impact and erode surfaces of adjacent gear teeth. In the short term, erosion debris contaminate the fluid being pumped. Over time, continued erosion can damage gear teeth which decreases pumping efficiency and necessitates more frequent component repair or replacement.

Features and steps are described which can reduce or mitigate a number of these issues, while still retaining the high reliability of gear pumps. A small amount of fluid can be transferred in a targeted manner from the high-pressure conduit region 70B to low-pressure conduit region 70A (FIG. 2), by which pump operation and life of the gears can be improved. Specifically, the small amount of fluid can be targeted to flow into unmeshing pocket(s) 79B to more quickly increase the amount of fluid in this area as the volume of unmeshing pocket(s) 79B (FIG. 2) rapidly expands. In certain embodiments, some or all of the additional fluid redirected to unmeshing pocket(s) 79B can come from meshing pocket(s) 79A (FIG. 2).

As best seen in subsequent figures, one approach is for the first set of gear teeth and/or the second set of gear teeth to include one or more gear tooth passageways extending through some of all of the teeth in each set to fluidically connect opposing (e.g., first and second) faces of each tooth. In the subsequent figures, gear tooth passageways can be disposed through at least some of the teeth 52, 56 on one or both gears 48, 50. These passageways can be aligned roughly along a mid-point centerline of each tooth to generally diverge along a flow direction of the fluid to more quickly and timely fill unmeshing pocket(s) 79B with fluid from meshing pocket(s) 79A. This has an effect of reducing or eliminating two-phase flow (i.e. vapor and liquid) that would otherwise occur under certain flow conditions, increasing component life while minimizing pumping losses.

Figure 3B:
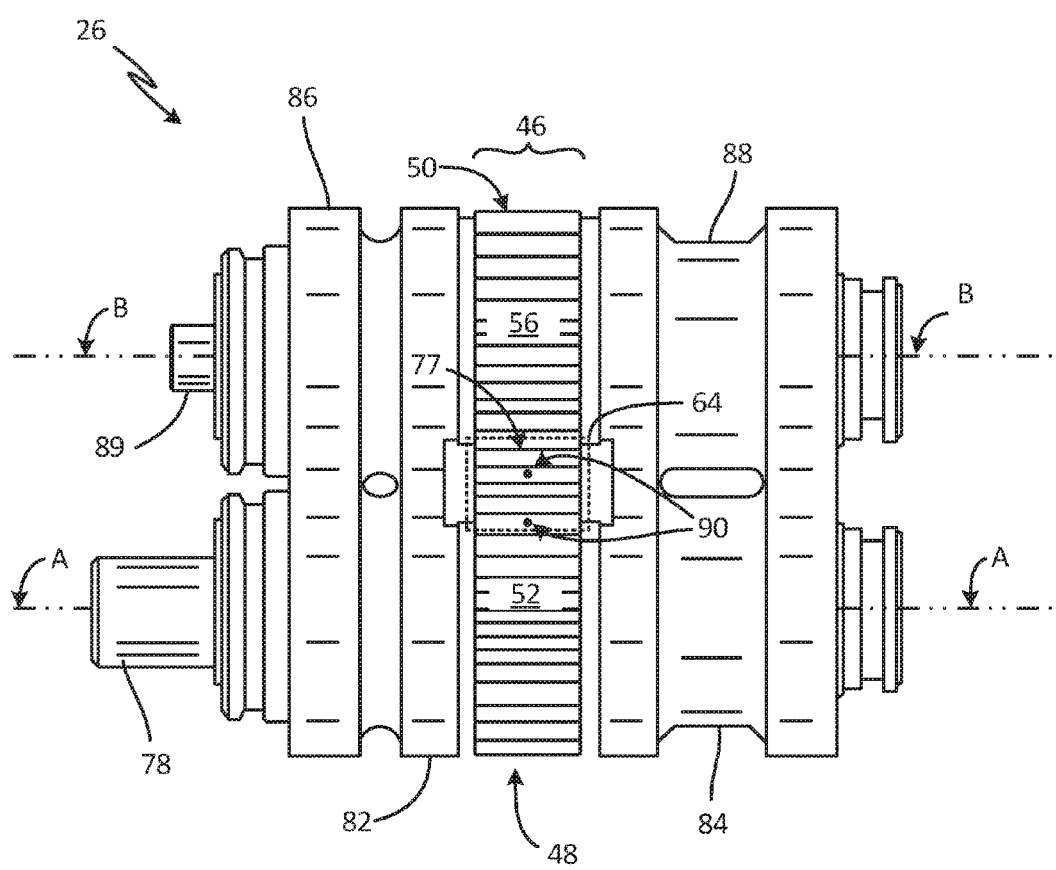
FIG. 3B shows an outlet side of the example gear pump stage from FIG. 3A.

FIG. 3A shows an inlet-side view of a part of first gear pump stage 26, while FIG. 3B is a corresponding outlet-side view of said part of first gear stage 26. These descriptions of first gear pump stage 26 can readily be adapted to second gear pump stage 28 (shown in FIGS. 1 and 9) unless otherwise noted. First drive gear 48 is rotatable around axis A and driven gear 50 is rotatable around axis B (also shown in FIG. 9). In FIGS. 3A and 3B, gear unit 46 includes drive gear 48 meshed with driven gear 50. Drive gear 48 can be rotatably connected to input/drive shaft 78, which provides motive power thereto along axis A (see also FIG. 9). Bearing assembly 80 rotatably supports gear unit 46, with drive gear 48 and driven gear 50 each generally supported on either side by a stationary bearing and a floating bearing.

Generally, a drive gear or driven gear, depending on the configuration, is mounted axially between a stationary bearing and a floating bearing. Drive gear 48 mounted on input shaft 78, rotating around axis A can be supported by a pair of drive-side bearings, and driven gear 50 mounted on output shaft 89, rotating around axis B can be supported by a pair of driven-side bearings. One pair of journal bearings can be stationary bearings, while the other pair can be pressure loaded floating bearings, capable of axial movement within their respective housings (not shown). Typically, but not exclusively, a bearing assembly for a gear pump can be arranged as shown in FIGS. 3A and 3B, which show the pair of drive-side bearings including drive-side stationary journal bearing 82 and drive-side floating journal bearing 84, and the pair of driven-side bearings including driven-side stationary journal bearing 86 and driven-side floating journal bearing 88.

The pair of floating journal bearings (e.g., bearings 84 and 88) can be arranged distally from the input drive shaft (e.g., shaft 78) or other coupling, while the pair of stationary bearings (e.g., bearings 82 and 86) can be disposed proximate to the input drive shaft or coupling. In many but not all modes of operation, this can dampen and react axial drive forces transferred from the input shaft or other drive coupling. FIGS. 3A and 3B also show output shaft 89 for connection to other devices (e.g., second pump stage 28 shown in FIGS. 1 and 9).

Fluid to be pressurized (e.g., liquid fuel) is directed in drive gear pockets 72 and driven gear pockets 74 (both shown in FIG. 2) from one or more pump stage inlet openings 62 to one or more pump stage output openings 64. Dashed lines in FIGS. 3A and 3B which delineate openings 62, 64 respectively, as well as housing 42 (shown in FIG. 2) have been omitted for clarity. One or more of bearings 82, 84, 86, 88 can optionally include cutback portions to further facilitate flow into and out of gear passages.

As also noted with respect to FIG. 2, one or both sets of drive gear teeth 52 and driven gear teeth 56 can include ports for a plurality of internal gear tooth passageways disposed therethrough. These passageways generally extend from a high-pressure region to a low-pressure region where fluid vapor is likely to form. In certain modes, these low-pressure flow regions can include areas in low-pressure conduit region 70A near pump stage inlet opening 62 as the teeth unmesh (best seen in FIG. 4). For these passageways, FIG. 3A shows gear tooth passageway exits 92 visible on respective ones of high-pressure fluid gear tooth faces (not numbered). And in FIG. 3B, gear tooth passageway entrances 90 can be seen on respective ones of low-pressure fluid gear tooth faces (not numbered).

Figure 4:
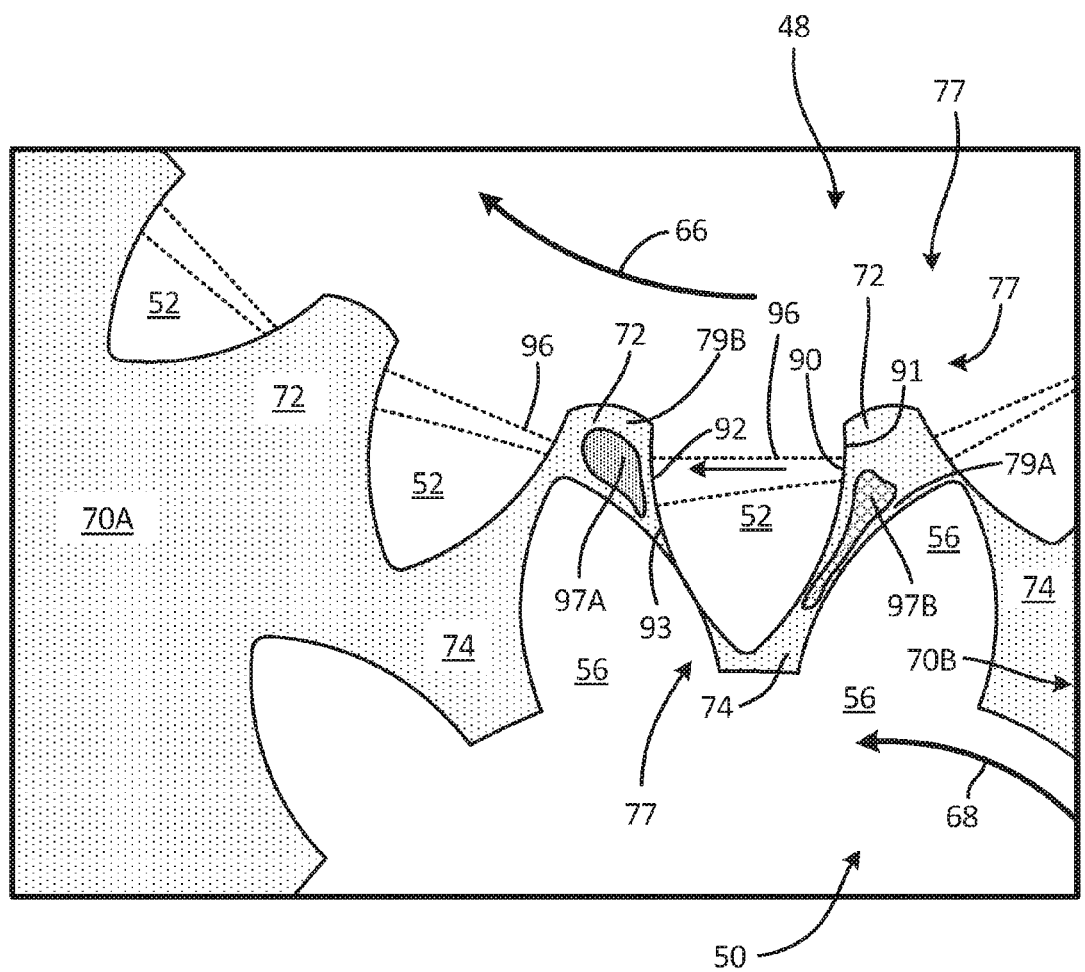
FIG. 4 is a detailed view showing a gear tooth passageway between high-pressure and low-pressure fluid regions.

FIG. 4 is a detailed view of meshing region 77 at the intersection of gears 48, 50. Fluid in low-pressure conduit region 70A, high-pressure conduit region 70B, and meshing region 77 is shown via stippled markings. FIG. 4 shows an example mode of operation of gear tooth passageway(s) 96. Fluid is generally carried away from low-pressure conduit region 70A via pockets 72, 74 (best shown in FIG. 2). Under normal or expected flow conditions, high-pressure fluid, having been drawn around by rotation of gears 48, 50 in respective directions 66, 68, then converges in high-pressure conduit region 70B (also shown in FIG. 2).

Through operation of the pump, rotating teeth 52, 56 (and in turn, respective pockets 72, 74), approach meshing region 77 disposed between the pump stage inlet and outlet (shown in FIG. 2). Both meshing pocket(s) 79A and unmeshing pocket(s) 79B are combinations of individual gear pockets 72, 74, varying in size as teeth 52, 56 engage meshed surfaces and pockets while passing through meshing region 77. A localized region of high-pressure 97B develops around meshing pocket(s) 79A, which is closer to pump stage outlet opening 64 (shown in FIG. 2). Similarly, as teeth 52, 56 (and respective pockets 72, 74) unmesh, a localized low-pressure region 97A develops around unmeshing pocket(s) 79B, which is closer to pump stage inlet opening 62 (also shown in FIG. 2).

The degree of pressure reduction, and thus the risk of two-phase flow formation in and around localized low-pressure region(s) 97A during conventional gear pump operation is generally directly proportional to a rotational speed of the gear pump. In other words, as pump rotational speed increases, gears 48, 50 mesh and unmesh at a higher rate, causing the incoming fluid to quickly expand into the rapidly growing volume space between gear teeth 52, 56, (e.g., unmeshing pockets 79B). This increases risks that incoming liquid can expand too quickly, causing some of the fluid to locally decrease below the fluid's vapor pressure as that said fluid fills the rapidly growing volume of unmeshing pockets 79B.

Gear tooth passageways 96, here shown as being disposed through drive gear teeth 52, can redirect a small amount of high-pressure fluid, such as from localized high-pressure fluid region 97B in or around meshing pocket(s) 79A. The high-pressure fluid to be redirected enters through gear tooth passageway entrances 90, traverses gear tooth passageway 96, and eventually exits through gear tooth passageway exits 92 into localized low-pressure region 97A. With the orientation of gear tooth passageways 96 (examples shown in subsequent figures), the fluid through passageways 96 forms a "jet" or other supplemental flow (best seen in FIGS. 5 and 7) that reaches low-pressure region 97A. Depending on the size of the passage(s), pump rotational speed, and other factors, supplemental passageway flow increases pressure in low-pressure region 97A to reduce or eliminate the formation of two-phase flow near pump stage inlet opening 62 (shown in FIG. 2). In addition, the high-momentum of the injected fluid "jet" through passageways 96 acts as a fluidic "shield" protecting the vulnerable surface of the gear tooth near its mid-point centerline region which is, in general, most susceptible to cavitation erosion from collapsing vapor bubble(s) in a low-pressure regions of two-phase flow.

Figure 5:
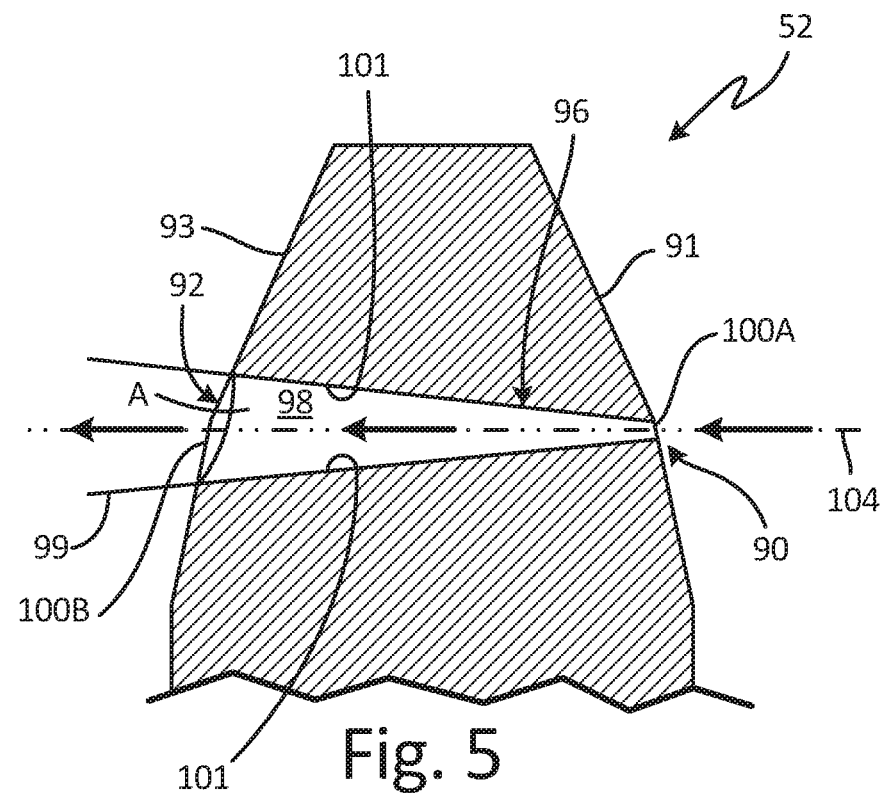
FIG. 5 is a top sectional view of a first example embodiment of a passageway through a gear tooth.

FIG. 5 shows a first sectional view of a gear tooth having a first example embodiment of passageway 96. This is taken as a side view through one drive gear tooth 52, with gear tooth passageway 96 extending from first/high-pressure tooth face 91 to second/low-pressure tooth face 93, allowing fluid communication therebetween. High-pressure fluid can enter gear tooth passageway entrances 90, formed through first tooth face 91, and at least part of this fluid can come from localized high pressure region 97B in or around meshing teeth 79A (as shown in FIG. 4). Fluid then exits passageway 96, via gear tooth passageway exits 92, formed through second tooth face 93. At least some of this exiting fluid is directed into or near a localized low-pressure fluid region in or around unmeshing teeth 79B (also shown in FIG. 4).

Passageway 96, as an overall entity, generally diverges such that the cross-sectional area of the passage either periodically or continuously increases from the first/high-pressure gear tooth face 91 to second/low-pressure gear tooth face 93. Generally, one or more passageway walls 101, or diverging parts thereof, can diverge at about 15-30 degrees from passageway centerline 104 to reduce or avoid fluid separation due to adverse pressure gradients along the inner surfaces of the passageway walls 101 within the gear tooth passageway 96.

In certain embodiments, at least exit segment 98 of gear tooth passageway 96 diverges similar to a diffuser, so that supplemental fluid slowly expands as it approaches gear tooth exit 92 at second/low-pressure tooth face 93. This helps maintain sufficient pressure differential while also allowing exiting fluid 99 to fan out. Exiting fluid 99 can thus act as a fluid screen for second/low-pressure tooth face 93, protecting it from damage otherwise caused by collapse and flashback of any transient vapor bubbles which still manage to form in or around localized low-pressure region 97A (as shown in FIG. 4).

Figure 6A:
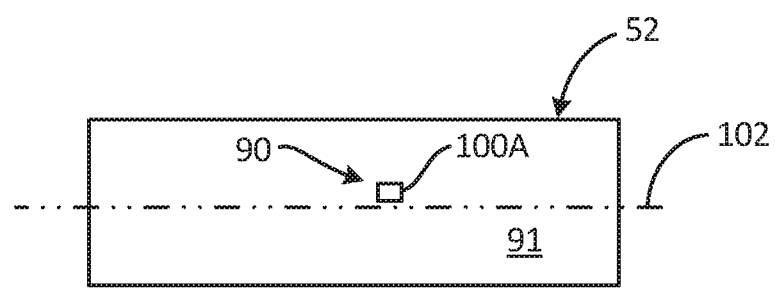
FIG. 6A is a view from a high-pressure fluid side of the gear tooth in FIG. 5.
Figure 6B:
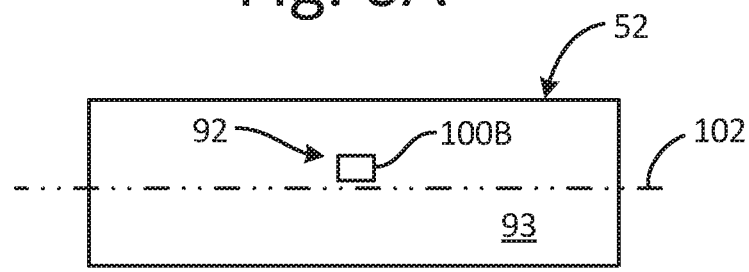
FIG. 6B is a view from a low-pressure fluid side of the gear tooth in FIG. 5.

FIG. 6A shows a view toward first/high-pressure gear tooth face 91. Here gear tooth passageway entrance 90 is a single entrance opening 100A (also shown in FIG. 5) disposed at or proximate midspan centerline 102 of drive gear tooth 52. Similarly, FIG. 6B shows a view toward second/low-pressure gear tooth face 93, with gear tooth passageway exit 92 having a single exit opening 100B (also shown in FIG. 5).

Gear tooth passageway exit 92 can generally be formed such that fluid exits in the vicinity of tooth midspan 102, as vapor pockets in the fluid mostly tend to form in this vicinity, while adding gear tooth passageway(s) 96 around this location will typically have the least possible structural effect on the gear teeth.

Locating gear tooth passageway entrance 90 and exit 92 near tooth midspan 102 can also minimize any structural effects and efficiency debits caused by essentially repumping an additional volume of fluid. Passage centerline 104 (FIG. 5) can be aligned with or slightly offset from tooth midspan 102 depending on approximately where localized low-pressure regions 97A and/or high-pressure regions 97B are likely or expected to arise in a given design and set of operating parameters. On a typical spur gear fuel pump, the slot opening can be on the order of 15-20 mils (about 0.38 to about 0.51 mm) to further confine pumping losses to a negligible or acceptable amount when compared to the improved high-speed performance and/or expected life increases of the pump and its parts. Location, size, and passage angles can also be tailored to minimize any structural weaknesses in the teeth while arriving at desired performance goals.

Note that the total area of gear tooth exit opening(s) 100B is larger than a total entrance area of gear tooth entrance openings 100A, which is consistent with the diverging exit segment 98 of gear tooth passageway 96 (shown in FIG. 5). As was described there, the redirected fluid should slightly expand as it passes through passageway 96 to reduce or avoid fluid separation along the inner surfaces of the passageway walls 101 within the passageway 96.

Figure 7:
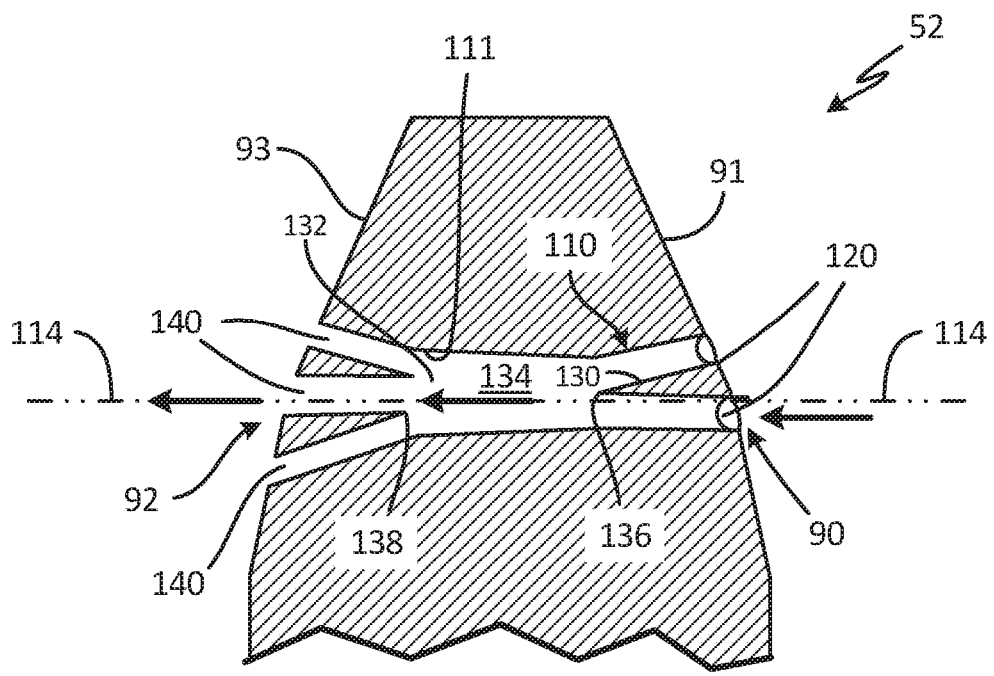
FIG. 7 is a top sectional view of a first example embodiment of a passageway through a gear tooth.

FIG. 7 shows a second example embodiment of gear tooth 52 with gear tooth passageway 110, exemplifying one or more optional modifications which can be made based on expected flow conditions. Like the first example embodiment shown in FIGS. 5-6B, this second example embodiment, passageway 110 extends from first/high-pressure tooth face 91 to second/low-pressure tooth face 93, allowing fluid communication therebetween. Passageway 110, as an overall entity, again generally diverges such that the cross-sectional area of the passage either periodically or continuously increases from gear tooth passageway entrance 90 at first/high-pressure tooth face 91 to gear tooth passageway exit 92 at second/low-pressure tooth face 93. One or more passageway walls 111, or diverging parts thereof, can diverge at about 15-30 degrees from passageway centerline 114 to reduce or avoid fluid separation due to adverse pressure gradients along the inner surfaces of the passageway walls 111 within the gear tooth passageway 110.

Gear tooth passageway entrance 90 can include a plurality of gear tooth entrance openings 120. In this example, passageway 110 can be described as including three segments, an entrance segment 130, an exit segment 132, and a middle segment 134. Entrance segment 130 fluidically connects entrance openings 120 to middle segment 134, and exit segment 132 fluidically connects middle segment 134 to exit openings 140. In certain embodiments, the total flow area through middle segment 134 (as shown in FIG. 7) can at least partially diverge between first end 136 and second end 138.

In certain embodiments, at least some of the plurality of gear tooth entrance openings 120 include different entrance angles relative to passage centerline 114 such that at least some entrance openings 120 lead to and converge at a single middle segment 134 of internal gear tooth passageway 110. A plurality of gear tooth exit openings 140, at least some of which can include different exit angles relative to passage centerline 114 such that the at least some gear tooth exit openings 140 lead and diverge from middle segment 138 (as shown in FIG. 7) of the internal gear tooth passageway 110.

Figure 8A:
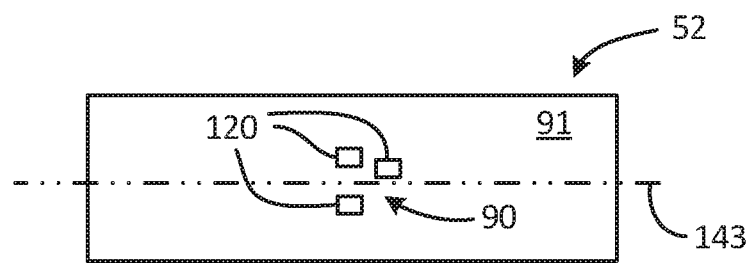
FIG. 8A is a view from a high-pressure fluid side of the gear tooth in FIG. 7.
Figure 8B:
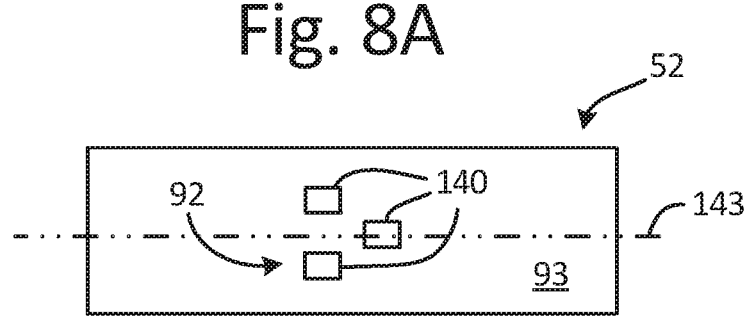
FIG. 8B is a view from a low-pressure fluid side of the gear tooth in FIG. 7.

FIG. 8A shows a view of tooth 52 toward first/gear tooth high-pressure face 91. Here gear tooth entrance 90 includes several entrance openings 120 disposed at or proximate midspan centerline 143 of drive gear tooth 52. Similarly, FIG. 8B shows a view toward second/low-pressure gear tooth face 93, with gear tooth passageway exit 92 having multiple outlet openings 140. As also noted with respect to the first example embodiment with single passageway entrance and exit openings, multiple gear tooth passageway exit openings 140 can generally be formed such that fluid exits gear tooth passageway 110 in the vicinity of tooth midspan 143, where vapor pockets in the fluid mostly tend to form, while adding passageway(s) 110 around this location will typically have the least possible structural effect on gear teeth 52. Passage centerline 114 can be aligned with or slightly offset from tooth midspan 143 depending on approximately where localized low-pressure region(s) 97A and/or high-pressure region(s) 97B (shown in FIG. 4) are likely or expected to be in a given design and set of operating parameters. The number, orientation, and cross-sections of the entrance openings 120 on the first/high-pressure gear tooth face 91, and the exit openings 140 on the second/low-pressure gear tooth face 93 can be determined in a manner to optimize the performance of the disclosed gears and gear pump(s). Additional considerations can be taken into account to balance performance with other design parameters, such as but not limited to cost and time to manufacture, product life, and structural integrity of the gear teeth.

FIG. 9 shows an example of one type of dual-stage gear-driven fuel pump 16 as in FIG. 1. While thus far, the disclosure has been presented with respect to a single pump stage, e.g., first pump stage 26 referenced in FIG. 1, it will be appreciated that a second pump stage (e.g., stage 28 shown in FIG. 1) can additionally or alternatively incorporate gear tooth passageways in the manner shown. As such, except where otherwise noted or described, the preceding descriptions can equally apply to first gear pump stage 26 and second pump stage 28.

FIG. 9 shows that first drive gear 48 can be rotatably coupled, either directly or indirectly, to input/drive shaft 78 (shown in FIGS. 2-3B). First/servo gear pump stage 26 and second/main gear pump stage 28 can be operated and driven in series or parallel by a single motor or motive unit, or by multiple motive units. The motive unit can be any suitable electrically or mechanically operated device. Here, the motive unit can be a conventional single-phase or three-phase electrical motor with rotor 141 (accompanying stator omitted for clarity). Rotor 141 or another motive element can be rotatably connected to input/drive shaft 78 (also shown in FIG. 3A) along axis A for driving first/servo gear pump stage 26, which is in turn operably connected to second gear pump stage 28. For example, stages 26, 28 can be rotatably connected via output shaft 89 and/or coupling shaft 144 disposed along axis B.

As in FIG. 2, FIG. 9 shows first drive gear 48 having first drive gear teeth 52 meshed with first driven gear teeth 56 on first driven gear 50. First drive gear 48 is rotatably supported about axis A by drive-side bearings 82, 84, and first driven gear 50 is rotatably supported about axis B by driven-side bearings 86, 88 (also shown in FIGS. 3A and 3B). Fluid to be pumped enters first stage 26, between gears 48, 50 via pump stage inlet opening 62 and exits via pump stage outlet opening 64 (shown in FIG. 2).

Second drive gear 148 can also be rotatably coupled, either directly or indirectly, to input/drive shaft 78. In the example shown, first and second pump stages 26, 28 are driven in series, where second drive gear 148 is rotatably connected to first driven gear 50 via coupling shaft 144, or the like. In this arrangement, second drive gear 148 has a plurality of drive gear teeth 152 which mesh with second driven gear teeth 156 disposed circumferentially around second driven gear 150. Second gears 148, 150 can similarly be rotatably supported by a second bearing assembly, e.g., second drive gear 148 rotatably supported about axis B by at least one drive-side bearing 182. Second driven gear 150 is rotatably supported about another axis (not shown) by at least one driven-side bearing 186.

Fluid to be pumped by second stage 28 enters gears 148, 150 via second pump stage inlet opening 162. Outlet opening for second stage 28, obscured in FIG. 9, is disposed opposite pump stage inlet opening 162, similar to the arrangements of openings 62, 64 shown in FIG. 2. It will be appreciated, however, that in second pump stage 28, one or both of second drive gear 148 and second driven gear 150 can include respective gear tooth passageways 96 and/or 110 (not visible in FIG. 9, but shown in the preceding figures). Pump 16 can be supported at one end by mount plate 200, which is shown in exploded view in an effort to better show certain features of second gear pump stage 28, including bearings 184, 188.

The series configuration shown in FIG. 9 can allow simultaneous and selective operation of one or both first gear pump stage 26 and second gear pump stage 28. In certain alternative embodiments, pump stages 26, 28 can be driven in parallel. In one such configuration, input/drive shaft 78 (shown in FIGS. 2-3B) can be in line with coupling shaft 144 along what is shown as axis B. With this modification, this would result in first driven gear 48 becoming the first drive gear, while first drive gear 50 would become the first driven gear. A similar outcome would result from operably connecting a second drive gear and a first drive gear through a common shaft.

While parallel operation offers certain efficiencies when both stages are actively pumping, operating both stages from a common shaft, or from collinear drive and coupling shafts can limit flexibility. To regain flexibility, additional elements would be required but would increase complexity of the system when it is necessarily or desirable to shut down one stage, such as during low demand or emergency conditions. In some instances, such a tradeoff between system efficiency and complexity can be acceptable.

It should also be noted that the above disclosure is not limited to complete gear pump or fluid system assemblies. Some or all of the above components can be incorporated as a line-replaceable unit (LRU). One such LRU can include a first gear unit (e.g., gear unit 46 shown in FIG. 2) including a first plurality of gear teeth disposed generally circumferentially about a first gear body; a first plurality of internal gear tooth passageways disposed through the first plurality of gear teeth, each of the first plurality of internal gear tooth passageways extending between an entrance on a first/high-pressure fluid gear tooth face, and an exit on a second/low-pressure fluid gear tooth face; wherein a total area of the gear tooth exit is greater than a total area of the gear tooth entrance.

The first gear unit of the LRU can optionally include a first bearing operably connected to the first gear body. The line-replaceable unit can also optionally include a second gear unit comprising a second plurality of gear teeth disposed generally circumferentially about a second gear body. The housing can include a stage inlet and a stage outlet, the first gear unit and the second gear unit disposed in a housing with the first plurality of teeth in meshing communication with the second plurality of gear teeth in an area of the housing between the stage inlet and the stage outlet.

For example, an LRU as described can be utilized for repair, maintenance, and/or retrofit. Upon wear or failure of a gear pump, the used component can be removed after disassembly of the appropriate component or system. One of the above LRU's (e.g., gear, gear+bearing, gear pump unit, etc.) having at least one embodiment of the described passageways can then be installed in its place prior to reassembly and placement back into service. Similarly, existing parts can be retrofit with an LRU to increase efficiency. When made for replacement parts or LRUs, the passageways can be tailored to address particular instances of erosion or other vapor pocket damage as evidenced by forensic examination of used components and their known operating conditions.

Discussion of Possible Embodiments

The following are non-exclusive descriptions of possible embodiments of the present invention.

An embodiment of a gear pump arrangement includes a first gear defining a first set of teeth; and a second gear defining a second set of teeth, the first set of teeth and the second set of teeth being in meshed communication such that fluid is pumped in response to rotation of the first gear and the second gear, at least one of the first set of teeth and the second set of teeth having at least one gear tooth passageway through each tooth thereby fluidically connecting opposing faces of the tooth.

The arrangement of the preceding paragraph can optionally include, additionally and/or alternatively, any one or more of the following features, configurations and/or additional components:

A gear pump arrangement according to an exemplary embodiment of this disclosure, among other possible things includes a first gear defining a first set of teeth; and a second gear defining a second set of teeth, the first set of teeth and the second set of teeth being in meshed communication such that fluid is pumped in response to rotation of the first gear and the second gear, at least one of the first set of teeth and the second set of teeth having at least one gear tooth passageway through each tooth thereby fluidically connecting opposing faces of the tooth.

A further embodiment of the foregoing arrangement, wherein the at least one gear tooth passageway extends between a gear tooth entrance on a first gear tooth face and a gear tooth exit on a second gear tooth face opposite the first gear tooth face.

A further embodiment of any of the foregoing arrangements, wherein a total exit area of the gear tooth exit is greater than a total entrance area of the gear tooth entrance.

A further embodiment of any of the foregoing arrangements, wherein the gear tooth entrance includes a plurality of gear tooth entrance openings.

A further embodiment of any of the foregoing arrangements, wherein at least some of the plurality of gear tooth entrance openings include different entrance angles such that the at least some entrance openings converge from the first gear tooth face to a middle segment of the at least one gear tooth passageway.

A further embodiment of any of the foregoing arrangements, wherein the gear tooth exit includes a plurality of gear tooth exit openings.

A further embodiment of any of the foregoing arrangements, wherein at least some of the plurality of gear tooth exit openings include different exit angles such that the at least some gear tooth exit openings diverge from a middle segment of the at least one gear tooth passageway.

A further embodiment of any of the foregoing arrangements, wherein the total flow area through a middle segment of the at least one gear tooth passageway diverges from an end closer to the gear tooth inlet face toward an opposing end closer to the gear tooth outlet face.

A further embodiment of any of the foregoing arrangements, wherein the first gear tooth face is a high-pressure fluid gear tooth face, and the second gear tooth face is a low-pressure fluid gear tooth face.

An embodiment of a gear pump assembly includes a motive input and a first pump stage. The first pump stage includes a first drive gear operably connected to the motive input, and a first driven gear in meshed communication with the first drive gear. A first plurality of gear tooth passageways is disposed through at least one of the first plurality of drive gear teeth, and the first plurality of driven gear teeth. Each of the first plurality of passageways fluidically connects a gear tooth entrance on a first high-pressure fluid gear tooth face, and a gear tooth exit on a first low-pressure fluid gear tooth face.

The assembly of the preceding paragraph can optionally include, additionally and/or alternatively, any one or more of the following features, configurations and/or additional components:

A gear pump assembly according to an exemplary embodiment of this disclosure, among other possible things includes a motive input; and a first pump stage comprising: a first drive gear operably connected to the motive input, the first drive gear including a first plurality of drive gear teeth disposed generally circumferentially about at least a portion of a first drive gear body; a first driven gear in meshed communication with the first drive gear via a first plurality of driven gear teeth disposed generally circumferentially about at least a portion of a first driven gear body; and a first plurality of gear tooth passageways disposed through at least one of: the first plurality of drive gear teeth, and the first plurality of driven gear teeth, each of the first plurality of passageways fluidically connecting a gear tooth passageway entrance on a first high-pressure fluid gear tooth face, and a gear tooth passageway exit on a first low-pressure fluid gear tooth face.

A further embodiment of the foregoing assembly, wherein the assembly further comprises a second pump stage operably connected, directly or indirectly, to the motive input, the second pump stage comprising a second drive gear operably connected to the motive input, the second drive gear including a second plurality of drive gear teeth disposed generally circumferentially about a second drive gear body; and a second driven gear in meshed communication with the second drive gear via a second plurality of driven gear teeth disposed generally circumferentially about a second driven gear body.

A further embodiment of any of the foregoing assemblies, wherein the second pump stage further comprises a second plurality of gear tooth passageways disposed through at least one of: the second plurality of drive gear teeth and the second plurality of driven gear teeth, each of the second plurality of gear tooth passageways extending between a gear tooth passageway entrance on a second high-pressure fluid gear tooth face, and a gear tooth passageway exit on a second low-pressure fluid gear tooth face.

A further embodiment of any of the foregoing assemblies, wherein the second drive gear is rotatably connected to the first driven gear.

A further embodiment of any of the foregoing assemblies, wherein the second drive gear and the first drive gear are operably connected to the drive coupling through a common shaft.

A further embodiment of any of the foregoing assemblies, wherein one of the first pump stage and the second stage pump includes a servo stage.

An embodiment of a line-replaceable unit includes a first gear arrangement, which includes a first plurality of gear teeth disposed generally circumferentially about a first gear body. A first plurality of gear tooth passageways is disposed through the first plurality of gear teeth. Each of the first plurality of passageways extend between an inlet on a high-pressure fluid gear tooth face, and an outlet on a low-pressure fluid gear tooth face. A total area of the gear tooth outlet is greater than a total area of the gear tooth inlet.

The line-replaceable unit of the preceding paragraph can optionally include, additionally and/or alternatively, any one or more of the following features, configurations and/or additional components: A gear pump assembly according to an exemplary embodiment of this disclosure, among other possible things includes a first gear arrangement comprising: a first plurality of gear teeth disposed generally circumferentially about a first gear body; a first plurality of gear tooth passageways disposed through the first plurality of gear teeth, each of the first plurality of passageways extending between an entrance on a first gear tooth face, and an exit on a second gear tooth face; wherein a total area of the gear tooth exit is greater than a total area of the gear tooth entrance.

A further embodiment of the foregoing line-replaceable unit, wherein the first gear arrangement further comprises: a first bearing portion operably connected to the first gear body.

A further embodiment of any of the foregoing line-replaceable units, wherein each gear tooth passageway includes at least one portion of diverging total flow area from the entrance to the exit.

A further embodiment of any of the foregoing line-replaceable units, wherein at least one of the entrance and the exit includes a plurality of openings in communication with a converged middle segment of the gear tooth passageway.

A further embodiment of any of the foregoing line-replaceable units, further comprising: a second gear unit comprising a second plurality of gear teeth disposed generally circumferentially about a second gear body; and a housing including a fluid conduit between a pump stage inlet and a pump stage outlet, the first gear unit and the second gear unit disposed in the housing with a portion of the first plurality of teeth meshing with a portion of the second plurality of gear teeth in a portion of the housing between the stage inlet and the stage outlet.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gear pump arrangement comprising:
a first gear defining a first set of teeth; and
a second gear defining a second set of teeth, the first set of teeth and the second set of teeth being in meshed communication such that fluid is pumped in response to rotation of the first gear and the second gear, at least one of the first set of teeth and the second set of teeth having at least one gear tooth passageway through each tooth thereby fluidically connecting opposing faces of the tooth,
wherein the at least one gear tooth passageway extends between a gear tooth entrance on a first gear tooth face and a gear tooth exit on a second gear tooth face opposite the first gear tooth face,
wherein the gear tooth entrance includes a plurality of gear tooth entrance openings or the gear tooth exit includes a plurality of gear tooth exit openings.

2. The arrangement of claim 1, wherein a total exit area of the gear tooth exit is greater than a total entrance area of the gear tooth entrance.

3. The assembly of claim 1, wherein at least some of the plurality of gear tooth entrance openings include different entrance angles such that the at least some entrance openings converge from the first gear tooth face to a middle segment of the at least one gear tooth passageway.

4. The assembly of claim 1, wherein at least some of the plurality of gear tooth outlet openings include different exit angles such that the at least some gear tooth outlet openings diverge from a middle segment of the at least one gear tooth passageway.

5. The assembly of claim 1, wherein the total flow area through a middle segment of the at least one gear tooth passageway diverges from a first end closer to the first gear tooth face toward an opposing second end closer to the second gear tooth face.

6. The arrangement of claim 1, wherein the first gear tooth face is a high-pressure fluid gear tooth face, and the second gear tooth face is a low-pressure fluid gear tooth face.

7. A gear pump assembly comprising
a motive input; and
a first pump stage comprising:
a first drive gear operably connected to the motive input, the first drive gear including a first plurality of drive gear teeth disposed generally circumferentially about at least a portion of a first drive gear body;
a first driven gear in meshed communication with the first drive gear via a first plurality of driven gear teeth disposed generally circumferentially about at least a portion of a first driven gear body; and
a first plurality of gear tooth passageways disposed through at least one of: the first plurality of drive gear teeth, and the first plurality of driven gear teeth, each of the first plurality of passageways fluidically connecting a gear tooth passageway entrance on a first high-pressure fluid gear tooth face, and a gear tooth passageway exit on a first low-pressure fluid gear tooth face,
wherein the at least one gear tooth passageway extends between a gear tooth entrance on a first gear tooth face and a gear tooth exit on a second gear tooth face opposite the first gear tooth face,
wherein the gear tooth entrance includes a plurality of gear tooth entrance openings or the gear tooth exit includes a plurality of gear tooth exit openings.

8. The assembly of claim 7, further comprising:
a second pump stage operably connected, directly or indirectly, to the motive input, the second pump stage comprising:
a second drive gear operably connected to the motive input, the second drive gear including a second plurality of drive gear teeth disposed generally circumferentially about a second drive gear body; and
a second driven gear in meshed communication with the second drive gear via a second plurality of driven gear teeth disposed generally circumferentially about a second driven gear body.

9. The assembly of claim 8, wherein the second pump stage further comprises:

a second plurality of gear tooth passageways disposed through at least one of: the second plurality of drive gear teeth and the second plurality of driven gear teeth, each of the second plurality of gear tooth passageways fluidically connecting a gear tooth passageway entrance on a second high-pressure fluid gear tooth face, and a gear tooth passageway exit on a second low-pressure fluid gear tooth face.

10. The assembly of claim 8, wherein the second drive gear is rotatably connected to the first driven gear.

11. The assembly of claim 8, wherein the second drive gear and the first drive gear are operably connected to the drive coupling through a common shaft.

12. The assembly of claim 8, wherein one of the first pump stage and the second pump stage includes a servo stage.

13. A line-replaceable unit comprising:
a first gear arrangement comprising:
   a first plurality of gear teeth disposed generally circumferentially about a first gear body;
   a first plurality of gear tooth passageways disposed through the first plurality of gear teeth, each of the first plurality of passageways extending between an entrance on a first gear tooth face, and an exit on a second gear tooth face;
   wherein a total area of the gear tooth exit is greater than a total area of the gear tooth entrance,
   wherein the at least one gear tooth passageway extends between a gear tooth entrance on a first gear tooth face and a gear tooth exit on a second gear tooth face opposite the first gear tooth face,
   wherein the gear tooth entrance includes a plurality of gear tooth entrance openings or the gear tooth exit includes a plurality of gear tooth exit openings.

14. The line-replaceable unit of claim 13, wherein the first gear arrangement further comprises:
a first bearing operably connected to the first gear body.

15. The line-replaceable unit of claim 13, wherein each gear tooth passageway includes at least one diverging total flow area from the entrance to the exit.

16. The line-replaceable unit of claim 13, wherein at least one of the entrance and the exit includes a plurality of openings in communication with a converged middle segment of the gear tooth passageway.

17. The line-replaceable unit of claim 13, further comprising:
a second gear arrangement comprising a second plurality of gear teeth disposed generally circumferentially about a second gear body; and
a housing including a fluid conduit between a pump stage inlet and a pump stage outlet, the first gear arrangement and the second gear arrangement disposed in the housing with a portion of the first plurality of teeth meshing with a portion of the second plurality of gear teeth.

* * * * *